Oct. 10, 1961   G. G. STANLEY   3,004,218
TIME METER
Filed Oct. 17, 1958
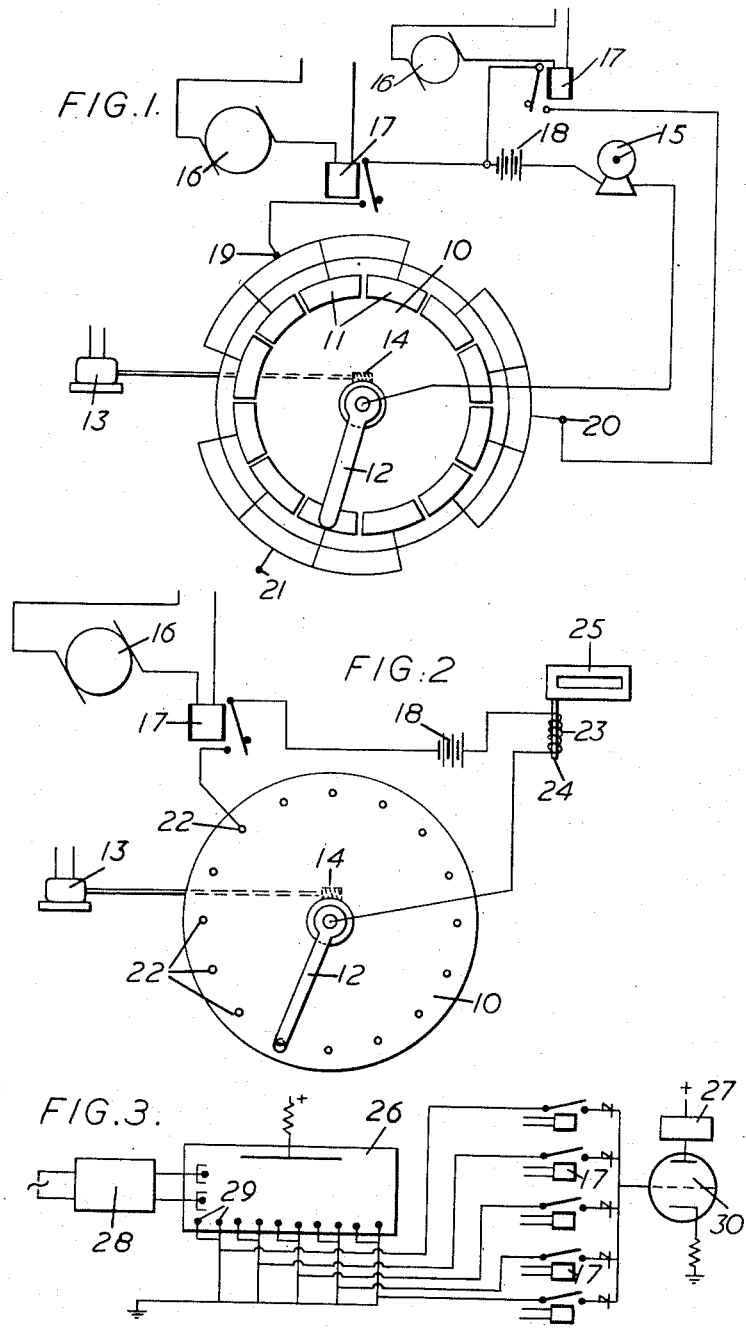
Inventor
Genge Geoffrey Stanley
By
Watson, Cole, Grindle & Watson
Attorney

United States Patent Office 3,004,218
Patented Oct. 10, 1961

3,004,218
TIME METER
George Geoffrey Stanley, % Marievale Consolidated Mines Limited, Marieshaft, Via Nigel, Transvaal Province, Union of South Africa
Filed Oct. 17, 1958, Ser. No. 767,827
Claims priority, application Union of South Africa Oct. 18, 1957
8 Claims. (Cl. 324—68)

This invention relates to meters for recording the combined average running time of a number of machines and in particular the overall average running time of a number of similar machines driven by electric motors.

In certain process industries employing a number of similar machines, it is frequently desired to know the overall average running time of all the units taken together over certain periods of elapsed time. The usual method of doing this is to add up the running times of each individual machine and divide the sum so obtained by the total number of machines. However, this method is prone to error arising from the human element, particularly when a large number of machines are involved, and in any case the operation is time-consuming especially when the machines are widely distributed.

The object of this invention is to provide apparatus by which automatically and continuously the average running time of any group of machines, or the overall average running time of a number of machines or groups of machines may be obtained.

In accordance with this invention a combined average running time meter for a number of machines comprises an electrically operated meter connected to a multicontact switch embodying means for connecting an electrical supply to the meter through the contacts in a regular repeating sequence, and means responsive to the running of each machine for controlling the electrical supply through the corresponding contact to the meter.

The invention is diagrammatically illustrated in the accompanying drawings in which:

FIG. 1 shows a combined average running time meter in which the current through a rotating switch is made through metal segments of a circle connected to a running time meter.

FIG. 2 shows a combined average running time meter similar to FIG. 1 but small terminal points are used instead of segments in the rotating switch and instead of a running time meter a pulse counter is used, and FIG. 3 illustrates an embodiment which is the electronic equivalent of the apparatus shown in FIG. 2.

In the form of the invention illustrated in FIG. 1 there is provided a rotating switch 10 comprising a number of electric contacts insulated from one another and arranged as segments 11 of a circle. A contact making arm 12 mounted at the centre of the circle of segments 11 is driven to rotate and make contact in sequence with all the segments 11 on each revolution of the arm 12. The rotating switch 10 may be driven by any suitable means, for instance by the electric motor 13 through a worm gearing 14.

An electric clock, which provides a running time meter 15, and is specially chosen for quick starting and stopping, is connected in series with the arm 12 of the rotating switch 10. For each electric motor 16 there is provided a relay 17 adapted to be closed only during the running of the motor 16. Each relay 17 connects a battery 18 in series with the running time meter 15 and a corresponding segment 11, or series of segments of the rotating switch 10 as hereafter described. Thus the bridging arm 12 will on rotation act to close the circuit in sequence through each segment 11 but only when the motor 16 corresponding to the particular segment 11 is running.

In the switch 10 illustrated in FIG. 1 twelve segments 11 are shown and twelve motors 16 could be connected thereto or a lesser number. For example if three motors 16 were in use three sections of segments would be used, each comprising four segments 11 connected together. The relay 17 each corresponding to a motor 16 would each be wired to terminals 19, 20, 21. The connection only to terminals 19 and 20 are illustrated by way of example.

The contact making arm 12 of the rotary switch 10 is conveniently provided with a spring loaded metal roller adapted to roll round the circle of segments 11 which are mounted on an insulated base and with an insulating gap between each. Alternatively, the arm 12 may terminate with the well known contact making brush. Neither of these contact making ends to arm 12 are shown as they are well known to persons skilled in the art.

With the device connected as described above whenever a motor 16 is switched on, the corresponding relay 17 will connect the current supply to the corresponding section of segments 11 and as the arm 12 of the rotating switch 10 passes over the segments 11 the running time meter 15 will operate. Thus the meter 15 will run only when the arm 12 contacts the segments 11 corresponding to a running machine. Should the circuit through any relay 17 open due to stoppage of the corresponding motor 16 the meter 15 will cease to operate during the passage of the arm 12 over the corresponding section of segments 11.

In an alternative form of the rotating switch 10 as shown in FIG. 2 instead of the segments 11 (FIG. 1) a circle of terminal points 22 are provided. During the rotation of arm 12 each terminal 22, if connected to a closed relay 17 associated with a corresponding running motor 16, registers an electric pulse. The solenoid 23 will be energised by each pulse and will move the plunger 24 to register one count on the mechanical counter 25.

In FIG. 3 illustrating the electronic equivalent of the embodiment shown in FIG. 2 the rotary switch is replaced by an electronic counting device which may be of any known type such as binary counters or the dekatron type of counter tube 26 illustrated. In this case the counter 25 is replaced by a pulse counter 27 and there are shown five relays 17 each of which would close when a corresponding motor 16 is running.

The stepping of the dekatron 26 may be effected in the normal manner by any suitable pulsed supply 28 such as that derived from the A.C. mains. The dekatron cathodes 29 are connected in pairs one pair corresponding to a motor and connected to the pulse counter 27 through a corresponding relay 17 and rectifier 30. Thus the pulses will be transmitted from each pair of cathodes 29 in sequence to operate the pulse counter 27 provided the relay 17 connected to the pair of cathodes is closed due to the running of the corresponding motor 16.

As the meters or counters record the average running times of the motors 16 the total running time of all the machines can be obtained by multiplying the recorded time by the total number of the motors.

It will be understood that the speed of the rotating switch 10 or its equivalent need not be constant providing that it does not change appreciably during the time of one revolution.

Where the combined average running time of a number of machines are required which are not driven individually by electric motors, switches will be substituted for relays 17 and operate in a similar manner. The switches may be closed by a movement of one part of the operating machine, by a governor or by other mechanical or other means while the machine is in operation.

For example a switch may be operated by the hydraulic pressure supplied to a hydraulic press only when the latter is operating.

In some cases other variables in connection with the motors or groups of machines may be recorded. For example a number of small motors may each be connected to a number of segments 11, contacts 22 or cathodes 29 corresponding to the horse-power of the motor. Thus the motor connected to one segment 11 may be a one horse-power motor, the second one connected to two segments 11 may be a two horse-power motor and so on. The result recorded on the meter would then indicate the average total power absorbed by the group of motors in a given time.

Having thus described the invention, what is claimed as new and desired to be secured by Letters Patent is:

1. A combined average running time metering system for a group of machines comprising an electrically operated meter, an electrical supply and a multicontact switch, the latter comprising a series of contacts one corresponding to each machine, means connecting the electrical supply to the meter through one of the contacts at a time in a regular repeating sequence, and switching means responsive to the running of each machine for connecting the electrical supply through one of said switch contacts to the meter.

2. A combined average running time metering circuit for a group of machines comprising an electrically operated meter, an electrical supply and a multicontact switch, the latter comprising a ring of separate contacts one corresponding to each machine and a driven rotary arm connecting the electrical supply to the meter through one of the contacts at a time in a regular repeating sequence, and means responsive to the running of each machine for connecting the electrical supply through a corresponding contact to the meter.

3. A combined average running time metering circuit for a group of machines comprising an electrically operated meter, an electrical supply and a multicontact switch, the latter comprising an electronic pulse operated counting device connecting the electrical supply to the meter through the contacts one at a time in a regular repeating sequence, and means responsive to the running of each machine for connecting the electrical supply through a corresponding contact to the meter.

4. A combined average running time metering circuit in accordance with claim 3 in which the meter comprises an electronic pulse counter.

5. A combined average running time metering circuit for a group of machines comprising an electrically operated meter, an electrical supply and a multicontact switch, the latter comprising a series of contacts one corresponding to each machine, means connecting the electrical supply to the meter through the contacts one at a time in a regular repeating sequence and a series of relay operated switches one corresponding to each contact of the multicontact switch for connecting the electrical supply through said contact to the meter.

6. A combined everage running time metering circuit for a group of machines comprising an electrically operated meter, an electrical supply and a multicontact switch, the latter comprising a ring of separate contacts one corresponding to each machine and a driven rotary arm connecting the electrical supply to the meter through the contacts one at a time in a regular repeating sequence and a series of relay operated switches one corresponding to each contact of the multicontact switch for coupling the electrical supply through one of said contact to the meter.

7. A combined average running time metering system for a group of machine comprising an electrically operated meter, an electrical supply and a multicontact switch, the latter comprising a series of contacts one corresponding to each machine, means connecting the electrical supply to the meter through the contacts one at a time in a regular repeating sequence, an electrical power supply connected to each machine and a relay switch in circuit with said electrical power supply for coupling the electrical supply through a corresponding contact to the meter.

8. A combined average running time metering circuit for a group of machines comprising an electric clock, an electrical supply and a multicontact switch the latter comprising a series of contacts one corresponding to each machine and means connecting the electrical supply to the clock through the contacts one at a time in a regular repeating sequence, and means including an associated contact responsive to the running of each machine for coupling the electrical supply through a contact of said multicontact switch to the clock.

References Cited in the file of this patent

UNITED STATES PATENTS

| | | |
|---|---|---|
| 2,405,801 | Swarr | Aug. 13, 1946 |
| 2,476,419 | Koenig | July 19, 1949 |
| 2,577,408 | Dobson | Dec. 4, 1951 |